United States Patent Office 3,714,062
Patented Jan. 30, 1973

3,714,062
STRAIGHT CHAIN SULFONATES FOR USE IN SOLUBILIZED OIL-WATER SOLUTIONS FOR MISCIBLE WATERFLOODING
Warren S. Askew and H. R. Froning, Tulsa, Okla., assignors to Amoco Production Company, Tulsa, Okla.
No Drawing. Filed Aug. 8, 1969, Ser. No. 848,748
Int. Cl. B01j 13/00
U.S. Cl. 252—308
9 Claims

ABSTRACT OF THE DISCLOSURE

Solubilized oil-water solutions of high water content and resistant to calcium and magnesium ions are prepared by mixing a solution of an alkali metal aliphatic hydrocarbon polymer sulfonate having an average molecular weight ranging from about 350 to about 675 with a cosurfactant or coupling agent which may be a water soluble alcohol, an oil soluble alcohol having not more than 10 carbon atoms, or an ethylene oxide adduct of an alcohol having from 4 to 10 carbon atoms. These solutions are useful as oil solvents in miscible waterflooding and can also be employed as solvents in water injection well cleanout procedures.

---

The present invention relates to new and useful compositions of matter and to methods for their application to assist in recovery of oil from underground deposits thereof. More particularly, it is concerned with solubilized oil-water solutions produced from certain synthetic aliphatic sulfonates, a cosurfactant or coupling agent, and fresh water or dilute brine. We have found that such solutions can remain essentially homogeneous and stable even with high concentrations of water, e.g., 80–90 weight percent, at temperatures of about 200° F. and in the presence of divalent ions such as calcium and magnesium. Such solutions in addition to being useful in miscible flooding oil recovery operations also find application as solvents in injection well cleanout procedures.

BACKGROUND OF THE INVENTION

Solubilized oil-water solutions or micro-emulsions employed in miscible flooding or similar operations should be effectively miscible with the oil-in-place, stable with respect to the connate water, and in turn be completely displaced by a driving fluid. Thus, both the composition of the solubilized oil-water solution and that of the driving fluid are critical. The driving fluid should possess controlled mobility to prevent loss of the miscibility characteristics between the solubilized oil-water slug and in-place oil due to viscous fingering and bypassing. Furthermore, the miscible slug itself will be trapped unless the driving fluid can displace the slug without a phase separation occurring in the porous media. Such phase separations do not occur if the driving fluid and micellar solutions are completely miscible or if an extremely low interfacial tension, e.g., 0.01 dyne per cm., exists between the fluids.

All of the solubilized oil-water solutions of which we are aware, employ as the principal surfactant either a synthetic alkyl aryl sulfonate or a petroleum mahogany sulfonate. However, we have found that the solubilized oil-water solutions employing such sulfonates can be extremely sensitive to temperature, divalent cations such as calcium and magnesium, and brine concentration. Hence, these solutions can generally satisfy only limited usage, e.g., low temperature sandstone reservoirs at low brine concentrations. A further disadvantage in use of the ordinary petroleum mahogany sulfonates is that their quality changes and therefore their properties are not constant, owing to the variations in lube stock or similar mineral oils from which such sulfonates are derived.

SUMMARY OF THE INVENTION

We have now discovered that straight chain sulfonates without any ring structure are capable of solubilizing larger amounts of brackish water into solution and produce stable solutions over a wide range of temperatures. This type of sulfonate is produced from an aliphatic hydrocarbon polymer and is therefore of a much higher purity than the petroleum mahogany sulfonate which, as pointed out above, is subject to variation in purity owing to the changing nature of the petroleum fractions from which it is derived.

The solubilized oil-water solutions of our invention comprise essentially an alkali metal straight chain polymer hydrocarbon sulfonate, a hydrocarbon oil which may be either a mineral oil or unreacted polymer of the type from which the straight chain sulfonate has been prepared, a coupling agent or cosurfactant, and a brine, the latter varying in strength from fresh water to about 55,000 p.p.m. of a salt of a monovalent cation. These solutions may be prepared, if desired, by first forming a mixture of the sulfonate, hydrocarbon oil, and cosurfactant, and thereafter contacting this mixture with a brine solution, e.g., .05 N sodium chloride. The brine and the aforesaid mixture are shaken vigorously with about 20 to about 95 percent of the former being dissolved into the solution of sulfonate, cosurfactant and oil, depending on the strength of the brine, the temperature and the ratio of sulfonate to cosurfactant. A solution representative of the novel compositions of our invention contains 13.2% polybutene sulfonate (molecular weight about 430), 3.3% of an ethylene oxide adduct of 1-hexanol averaging approximately 6 mols of ethylene oxide per mol of alcohol, 7.1% unreacted polymer carrier, and 76.4% of a 5,000 p.p.m. sodium chloride brine, all percentages being by weight. The sulfonates are used in the form of their ammonium or alkali metal salts. However, in situations where high calcium and/or magnesium brines are encountered, the ammonium salts are preferred, since with the corresponding sodium salts we have frequently found that stable emulsions are produced which are unsuited for use in miscible flooding because of their undesirable flow properties in the reservoir.

These solutions exhibit extremely good properties for use in miscible flooding operations. They are completely miscible with oil, i.e., oil goes into solutions in all proportions, while the presence of the salt tends to reduce the interfacial tension between the solubilized solution and brine down to a value of about 0.01 dyne per cm., thus creating a high degree of water solubility in the trailing edge of the solution slug being driven through the reservoir by means of an aqueous drive system. This phenomenon holds bypassing or trapping of the slug to a minimum and for all practical purposes produces essentially the same effect as is obtained through single phase miscible flooding.

In forcing the solution through a reservoir as contemplated by our invention the problem of mobility control can be an important factor owing to the difference in viscosity between the solubilized solution and the water used as the drive agent. To avoid fingering or bypassing of the driving water, thickened water having a mobility no greater than that of the solubilized solution is introduced into the system immediately following the solubilized slug.

Still another embodiment of the process of our invention concerns the use of these solubilized solutions in injection well cleanout procedures. In cases of this kind the size and content of the slug are not as important as when such solutions are used in driving to a producing well. The main objective in an injection well cleanout process is, of course, to reduce oil saturation and to dissolve or disperse the heavier oil and tar-like substances present in the vicinity of the well bore. Once such films and deposits are dissolved and the resulting solution carried out into the formation by a subsequent water driving step, the injectivity of the treated well will be observed to increase many fold. The procedure may be carried out with or without the use of an extraneous mobility control agent.

In carrying out a miscible flooding operation as contemplated by our invention the slug size may vary rather widely, however, for the majority of cases it may correspond from about 0.02 to about 0.15 pore volume. Slug sizes less than 0.02 pore volume or a few barrels per foot of pay may be used in the injection well cleanout method referred to above.

As examples of cosurfactants or coupling agents useful in preparing the solutions of our invention there may be mentioned the water soluble alcohols such as, for example, isopropyl alcohol, the oil soluble alcohols containing no more than 10 carbon atoms, and the 2 to 12 mol ethylene oxide adducts of primary alcohols having from 4 to 10 carbon atoms such as n-butanol, 2-ethyl hexanol, n-hexanol, n-octanol, n-decanol, and the like. In general we prefer to use the 6 to 8 mol ethylene oxide adducts of n-hexanol.

The sulfonates employed in the novel compositions described herein are prepared by sulfonating a polybutene or polypropene which is in turn prepared by polymerizing butene or propene in the presence of a catalyst such as aluminum chloride under known conditions. The polybutenes range in average molecular weight from about 300 to about 400 and the applicable polypropenes may vary from about 400 to about 575, as determined by Mechrolab Osmometer. These sulfonates are generally used in an oil solution, e.g., unreacted polybutene or polypropene, in which the sulfonate is present in a concentration of about 60 to about 80 weight percent.

We have observed that as the average number of ethylene oxide groups on the alcohol increases, the ratio of sulfonate to cosurfactant needed to obtain the desired solution properties increases. For the 2 mol adduct of n-hexanol a sulfonate:cosurfactant ratio of 2:3 is preferred while with the 5 and 6 mol average ethylene oxide adducts, the ratio changes to 4:1. Increasing the sulfonate: cosurfactant ratio lowers the final solution cost since the cosurfactant costs about four times as much as the sulfonate. These ethoxylated alcohols have a wide temperature range of potential application. For instance, at 200° F. a 4:1 active sulfonate:surfactant solution containing the 6 or 8 mol average adduct is clear and relatively mobile having a viscosity of about 5.5 cps. At room temperature its viscosity is about 34 cps. Over this temperature range the desired solution properties and water content can be controlled through variation of one or more of the following parameters: (1) sulfonate to cosurfactant ratio from 2:3 to 6:1; (2) the number of ethylene oxide groups on the n-hexanol (alcohol) molecule from an average of 2 to 6 or more; and (3) varying the monovalent cation content of the water component from distilled or fresh water to about 20,000 p.p.m. brine.

A further improvement provided by our invention is based on the discovery that the polysaccharide B-1459 described in U.S. 3,373,810 functions as an excellent mobility control agent for use in combination with the aforesaid solubilized oil-water solutions in miscible flooding operations. Further details on the preparation of this material are discussed in the Journal of Applied Polymer Science, vol. 5, page 519 (1961). In conducting a miscible flooding operation, ideally, the driving fluid is less mobile than the driven fluid. While this condition is difficult to achieve in practice, it can be approached by introducing between the solvent slug and the driving agent—in this case water—a control agent having a mobility less than that of the solvent slug. This, together with the fact that the driving water is miscible or highly soluble in the trailing edge of the bank or mobility control agent, prevents trapping of the solvent or bypassing of the water around the solvent and into the oil bank. While this concept of employing a mobility control agent was known prior to our invention we were unable—before this invention—to find a suitable material that was stable under a wide range of reservoir temperatures and at the same time would not adsorb to a substantial degree onto the reservoir rocks. In previous studies solubilized oil-water solutions of the type claimed herein have been displaced at low temperatures, e.g., 70–100° F., with certain driving or mobility control fluids such as partially hydrolyzed polyacrylamides, polysaccharides, corn syrup, or hydroxyethyl cellulose. However, at temperatures approaching 200° F. these materials became unstable and readily adsorbed onto the rock surfaces. Aqueous solutions of the polysaccharide B-1459 containing from about 0.05 to about 5 weight percent thereof can be used in volumes ranging from about 0.15 to about .65 pore volume. These materials retain their viscosity-increasing characteristics over a temperature range of from 70° to 200° F. Aqueous solutions of this polysaccharide derivative showed no thermal degradation and did not lose much of their viscosities at higher temperatures. With other mobility control agents, such as the partially hydrolyzed polyacrylamides, as much as 75% of the room temperature viscosity is lost at 200° F.

Flooding tests in consolidated Berea sandstone cores and unconsolidated sand packs have proven the technical operability of using these solubilized oil-water solutions in secondary or tertiary flooding operations. Injection of as low as 10% pore volume of 75% water content solutions has led to substantially total recovery of all previously "unrecoverable" oil in tertiary flooding tests. Solutions containing ammonium polybutene sulfonate (molecular weight 425) and the 6 mol ethylene oxide adduct of 1-hexanol can be made with a water content as high as 90–95%, making the potential chemical cost range from $1.50 to $3.00 per barrel of slug injected which is about 3 to 5 times cheaper than available prior art solutions for this purpose.

In designing solubilized oil-water solutions of the type contemplated herein for miscible flooding or similar operations, the controlling independent system variable is temperature. As the temperature is increased from 70° to 200° F., for example, the weight ratio of sulfonate to cosurfactant required for desired solutions should be increased from 2:3 to 4:1.

SPECIFIC EMBODIMENTS OF THE INVENTION

Our invention may be further illustrated by reference to the following specific examples.

Example I

A tertiary miscible flood was carried out in a Berea sandstone core 22 inches long by 2 inches in diameter wherein the core was first flooded with .25 N NaCl brine, followed by injection of Midland Farms (West Texas) crude oil to simulate formation conditions. The core was then water-flooded, after which a slug of solubilized oil-water solution having the following compositions was injected.

12.28% ammonium polybutene sulfonate having a molecular weight of about 398,
9.65% of polybutene polymer having a molecular weight of about 300,
3.07% of a 6 mol ethylene oxide adduct of 1-hexanol, and
75.00% of a 0.25 N sodium chloride brine, all percentages being by weight. The test was carried out at 140° F. A volume of slug having the above composition corresponding to 22.7% pore volume was then injected into the core followed by injection of 45.6% pore volume of a mobility control fluid consisting of 0.3 weight percent solution of polysaccharide B–1459 in a 0.25 N sodium chloride brine. The oil recovered in the secondary waterflooding step amounted to 41.5% of the oil-in-place, while the tertiary flood with the composition of our invention as the solvent recovered 58.5% of the oil-in-place for a total recovery of 100%. The relatively high proportion of solvent and mobility control fluid used is due to the quantity of solvent and said fluid required to form separate banks within the core and the volume that such banks occupy in proportion to the entire pore volume available.

Example II

In this test the slug composition, type and size of core, and procedure for preparing it for tertiary flooding were the same as mentioned in Example I. The temperature at which the run was carried out was 106° F. Anton Irish (West Texas) crude oil was substituted for Midland Farms crude and the mobility control fluid consisted of 0.2 weight percent of polysaccharide B–1459 in 0.25 N brine. The amount of solvent slug injected was 24.9 percent pore volume and the mobility control fluid injected corresponded to 49.4% pore volume. In the secondary waterflooding step 37.3% of the oil-in-place was obtained, while the tertiary flood using the solubilized oil-water solution of our invention in combination with the specific mobility control agent taught herein yielded 62.7% of the oil-in-place for a total recovery of the in-place oil of 100%.

Example III

At 120° F. a run was carried out under essentially the same conditions as used in the above examples except Wasson ODC (West Texas) unit crude oil was used in place of Anton Irish crude. The solvent slug was injected in an amount corresponding to 25.2% pore volume and the mobility control fluid used corresponded to 48.4% pore volume. The secondary waterflood step resulted in a recovery of 45% of the oil-in-place, while the tertiary flood using the solvent and mobility control fluid in accordance with our invention yielded a 55% recovery of the in-place oil.

Example IV

In this case the slug composition, mobility control fluid, core and temperature were the same as in Example III except the volume percent of the brine in the solubilized solution was increased from 75% to 95%. The amount of solvent slug injected amounted to 33.8% pore volume and the mobility control fluid injected was 67.7%. The recovery yield by secondary waterflooding was 38.4% while that realized from tertiary recovery was 45.6% for a total of 84% of the in-place oil.

Example V

This run was made in a Berea sandstone core 96 inches long by 2 inches in diameter at a temperature of 200° F. The core was first flooded with a 5,000 p.p.m. mixed brine followed by injection of Midland Farms Ellenburger crude oil to simulate formation conditions. The core was then waterflooded after which a slug of solubilized oil-water solution was injected. The solution employed had the following composition:

14% ammonium polybutene sulfonate (molecular weight 425),
3.5% of the 6 mol average ethoxylated 1-hexanol,
7.5% of unsulfonated polybutene polymer as hydrocarbon oil, and
75% of a 5,000 p.p.m. aqueous brine containing sodium chloride, magnesium and bicarbonate ions, all percentages being by weight. An amount of this solution corresponding to 24.7% of the pore volume was injected followed by a 41.1% pore volume bank of a polysaccharide B–1459 aqueous solution (12.5 cps. at 70° F.) as the tertiary miscible flood. Thirty-one and nine-tenths percent (31.9%) of the in-place oil was recovered by means of the secondary waterflood and 68.1% was recovered with the tertiary miscible flood for an overall recovery of 100% of the oil-in-place. Most of the sulfonate was recovered as oil-phase emulsion.

To demonstrate the tolerance the straight chain sulfonates have for calcium or magnesium ions compared to that of typical petroleum sulfonates previously used to prepare similar solubilized oil-water solutions, reference is made to the data in the table below. In conducting this work 1 volume of a mixture of sulfonate and cosurfactant—in this case the 6 mol ethylene oxide adduct of 1-hexanol—in the ratio indicated, was added to 9 volumes of distilled water. Thereafter a measured amount of sodium chloride was added to the resulting mixture until a clear solution was formed at 200° F. This solution was then divided into two portions, to one of which was added additional sodium chloride until the system became unstable (at 200° F.). The second portion of the solution referred to was tested for calcium ion tolerance by the addition of calcium chloride to a solution of the composition indicated in column 3, until the system became unstable at 200° F.

TABLE I

| | P.p.m. | | | |
|---|---|---|---|---|
| Sulfonate | Active sulfonate-cosurfactant weight ratio | NaCl added to form stable solution | Total NaCl added to produce unstable solution | Calcium chloride added to solution in Col. 3 to form unstable solution |
| Purified mahogany sulfonate (molecular weight 470) | 4:1 | 4,000 | 6,000 | 1,000 |
| Ammonium polybutene sulfonate [1] | 4:1 | 11,900 | 25,600 | 2,360 |
| Do.[1] | 4:1 | 16,800 | 24,400 | 1,390 |
| Do.[1] | 4:1 | 6,800 | 32,200 | 1,930 |
| Do.[2] | 4:1 | 14,200 | 29,900 | 2,340 |

[1] Average molecular weight 398.
[2] Average molecular weight 475.

It will be noted that the salt concentrations of the different solutions shown in Column 3 of the above table vary rather widely. This is due to the fact that in manufacturing the polymer sulfonates the salt content of the final product is variable. Further, it will be seen from the information in Column 5 that in most cases solutions employing polybutene sulfonates tolerated approximately twice the amount of calcium that could be withstood by the petroleum mahogany sulfonate systems without formation of an unstable solution.

In Table II below, there is contained additional evidence demonstrating the tolerance of the straight chain ammonium hydrocarbon sulfonates for calcium ions as opposed to systems employing petroleum mahogany salts. In the solutions tested the active sulfonate to cosurfactant weight ratio was 4:1 and the water content in these solutions was 75 volume percent. The cosurfactant employed in all cases was the 6 mol ethylene oxide adduct of 1-hexanol.

TABLE II

| Sulfonate | Brine used | Room temperature (75° F.) | 140° F. |
|---|---|---|---|
| NH₄ polybutene sulfonate (Average molecular wt. 398). | 5,500 p.p.m. Ca⁺² | Single phase, dark amber hazy | Hazy, ~4% lower H₂O separation. |
| Do | {7,250 p.p.m. Na⁺, 2,725 p.p.m. Ca⁺²} | Single phase, slightly hazy amber | Single phase, crystal clear amber. |
| Do | {7,250 p.p.m. Na⁺, 5,500 p.p.m. Ca⁺²} | Single phase, clear amber | Dark hazy, ~50% H₂O separation. |
| Mahogany sodium soap (Average molecular wt. 525). | 5,500 p.p.m. Ca⁺² | Very thick hazy upper phase, 40% H₂O separation | |
| Do | {7,250 p.p.m. Na⁺, 2,725 p.p.m. Ca⁺²} | Very thick cloudy upper phase, ~45% H₂O separation | |
| Do | {7,250 p.p.m. Na⁺, 5,500 p.p.m. Ca⁺²} | Very thick emulsion upper phase, ~50% H₂O separation | |

Inasmuch as the mahogany soap systems were unstable at room temperature in the presence of the indicated amounts of calcium ion, it was considered unnecessary to test such mixtures at 140° F., since they obviously would have been unstable at that temperature level also.

The solubilized oil-water solutions of our invention are considered to differ significantly from previous chemical compositions suitable for use in miscible flooding and injection well cleanout operations primarily because of their outstanding stability at higher temperatures and their tolerance for divalent cations at such temperatures. Under these conditions no emulsion formation problems are encountered and these systems produce low interfacial tension with water solutions.

As used in the present description and claims the term "alkali metal aliphatic polymer hydrocarbon sulfonate" is intended to include the ammonium aliphatic hydrocarbon sulfonates as well as the corresponding alkali metal salts.

For purposes of this description the term "solubilized oil-water solution" is used to denote the solvent slug compositions contemplated herein and refers to systems consisting essentially of an alkali metal straight chain polymer hydrocarbon sulfonate, a cosurfactant—as defined herein—a hydrocarbon oil, and water, which may vary from fresh water up to about 55,000 p.p.m. in salinity.

We claim:

1. A solubilized oil-water solution comprising essentially an alkali metal straight chain hydrocarbon polymer sulfonate having an average molecular weight ranging from about 350 to about 675, a cosurfactant selected from the group consisting of a water-soluble alcohol, an oil-soluble alcohol having no more than 10 carbon atoms and a 2 to 12 mol ethylene oxide adduct of an alcohol having from 4 to 10 carbon atoms, the ratio of said sulfonate to cosurfactant ranging from about 1:5 to about 10:1, the combination of sulfonate and cosurfactant being present in a concentration ranging from about 3 to about 30 weight percent, from about 1 to about 50 weight percent of a hydrocarbon oil, and from 20 to about 96 weight percent of an aqueous brine containing up to about 55,000 p.p.m. of a salt of a monovalent cation.

2. The solution of chain 1 wherein the cosurfactant consists of a 2 to 8 mol ethylene oxide adduct of said alcohol.

3. The solution of claim 2 wherein said primary alcohol is 1-hexanol.

4. The solution of claim 1 wherein the water component is a sodium chloride brine.

5. The solution of claim 1 wherein the alkali metal sulfonate is an ammonium straight chain hydrocarbon polymer sulfonate.

6. The solution of claim 1 wherein the cosurfactant consists of a 6 to 8 mol ethylene oxide adduct of 1-hexanol.

7. The solution of claim 1 wherein the hydrocarbon portion of the sulfonate is a member derived from the group consisting of polybutene and polypropene.

8. A solubilized oil-water solution stable at temperatures up to about 200° F. employing as the surfactant an oil soluble alkali metal aliphatic hydrocarbon sulfonate, said hydrocarbon portion being derived from a polymer selected from the group consisting of polybutene and polypropene, said polymer ranging in molecular weight from about 300 to about 575.

9. The solution of claim 5 wherein the cosurfactant consists of a 6 to 8 mol ethylene oxide adduct of 1-hexanol.

References Cited

UNITED STATES PATENTS 2,160,343  5/1939  Ross _____ 252—353 X
3,506,070  4/1970  Jones _____ 166—273

JOHN D. WELSH, Primary Examiner

U.S. Cl. X.R.

252—309, 312, 49.5; 166—273